US010332485B2

(12) United States Patent
Aoki et al.

(10) Patent No.: US 10,332,485 B2
(45) Date of Patent: Jun. 25, 2019

(54) IMAGE CONVERTING METHOD AND DEVICE

(71) Applicant: EIZO Corporation, Ishikawa (JP)

(72) Inventors: Reo Aoki, Ishikawa (JP); Masafumi Higashi, Ishikawa (JP); Yusuke Bamba, Ishikawa (JP)

(73) Assignee: EIZO Corporation, Ishikawa (JP)

( * ) Notice: Subject to any disclaimer, the term of this patent is extended or adjusted under 35 U.S.C. 154(b) by 0 days.

(21) Appl. No.: 15/773,047

(22) PCT Filed: Nov. 17, 2015

(86) PCT No.: PCT/JP2015/082244
§ 371 (c)(1),
(2) Date: May 2, 2018

(87) PCT Pub. No.: WO2017/085786
PCT Pub. Date: May 26, 2017

(65) Prior Publication Data

US 2018/0322847 A1 Nov. 8, 2018

(51) Int. Cl.
*G06T 5/00* (2006.01)
*G09G 5/10* (2006.01)
(Continued)

(52) U.S. Cl.
CPC ................ *G09G 5/10* (2013.01); *G09G 5/02* (2013.01); *G09G 5/026* (2013.01); *G09G 5/36* (2013.01);
(Continued)

(58) Field of Classification Search
None
See application file for complete search history.

(56) References Cited

U.S. PATENT DOCUMENTS 8,417,064 B2 * 4/2013 Wakazono .............. G06T 5/008 382/167
9,270,867 B2 * 2/2016 Kim .................. H04N 1/40006
(Continued)

FOREIGN PATENT DOCUMENTS

JP 2011-117997 A 6/2011
JP 2012-198464 A 10/2012
(Continued)

OTHER PUBLICATIONS

Chou et al., "A Perceptually Tuned Subband Image Coder Based on the Measure of Just-Noticeable-Distortion Profile", 1995, IEEE Transactions on Circuits and Systems for Video Technology, vol. 5, No. 6, pp. 467-476 (Year: 1995).*
(Continued)

*Primary Examiner* — Phong X Nguyen
(74) *Attorney, Agent, or Firm* — Maier & Maier, PLLC

(57) ABSTRACT

An image converting method and image converting device that are able to properly reproduce the appearance of the original image even in an environment having different brightness. The image converting method includes a JND corresponding value width acquisition step of, on the basis of input image data, acquiring a JND corresponding value width corresponding to a reflectance component of the input image data, a luminance width acquisition step of acquiring a luminance width corresponding to the JND corresponding value width or a value obtained by converting the JND corresponding value width in accordance with a predetermined rule using, as a reference, a second reference luminance different from a first reference luminance.

8 Claims, 5 Drawing Sheets

(51) Int. Cl.
*G09G 5/02* (2006.01)
*G09G 5/36* (2006.01)

(52) U.S. Cl.
CPC . *G09G 2320/0626* (2013.01); *G09G 2340/06* (2013.01); *G09G 2340/10* (2013.01); *G09G 2340/14* (2013.01); *G09G 2360/144* (2013.01)

(56) References Cited

U.S. PATENT DOCUMENTS

| | | | | |
|---|---|---|---|---|
| 9,373,162 | B2 * | 6/2016 | Shieh | G06T 5/009 |
| 9,621,767 | B1 * | 4/2017 | El Mezeni | H04N 19/186 |
| 10,074,162 | B2 * | 9/2018 | El Mezeni | G06T 3/40 |
| 2006/0146193 | A1 * | 7/2006 | Weerasinghe | H04N 9/67 348/582 |
| 2008/0101719 | A1 * | 5/2008 | Lim | H04N 1/4072 382/274 |
| 2011/0128296 | A1 | 6/2011 | Mihara et al. | |
| 2012/0242716 | A1 | 9/2012 | Tanaka et al. | |
| 2014/0146198 | A1 | 5/2014 | Omori et al. | |
| 2015/0070400 | A1 * | 3/2015 | Motta | G09G 3/2092 345/690 |
| 2015/0117775 | A1 * | 4/2015 | Abe | G09G 5/02 382/167 |
| 2015/0154919 | A1 | 6/2015 | Ooshima | |
| 2017/0221405 | A1 * | 8/2017 | Yoshida | G09G 3/20 |
| 2017/0272618 | A1 * | 9/2017 | Higashi | G09G 5/00 |

FOREIGN PATENT DOCUMENTS

| | | | |
|---|---|---|---|
| JP | 2012-256168 | A | 12/2012 |
| JP | 2013-152334 | A | 8/2013 |
| JP | 2013-246265 | A | 12/2013 |
| WO | 2013/145388 | A1 | 10/2013 |
| WO | 2014/027569 | A1 | 2/2014 |

OTHER PUBLICATIONS

Choi et al., "Color Image Enhancement Based on Single-Scale Retinex With a JND-Based Nonlinear Filter", 2007, IEEE International Symposium on Circuits and Systems, pp. 3948-3951 (Year: 2007).*

Choi et al., "Color Image Enhancement Using Single-Scale Retinex Based on an Improved Image Formation Model", 2008, 16th European Signal Processing Conference (EUSIPCO 2008), pp. 1-5 (Year: 2008).*

Lee et al., "Image enhancement approach using the just-noticeable-difference model of the human visual system", 2012, Journal of Electronic Imaging, vol. 21(3), pp. 033007-1-033007-14 (Year: 2012).*

International Search Report dated Feb. 23, 2016 of corresponding International Application No. PCT/JP2015/082244; 2 pgs.

* cited by examiner

ANOTHER EXAMPLE OF FIRST EMBODIMENT

Yp: INCREASE IN LUMINANCE DUE TO EXTERNAL ENVIRONMENT

SECOND EMBODIMENT

Yp: INCREASE IN LUMINANCE DUE TO EXTERNAL ENVIRONMENT

IMAGE CONVERTING METHOD AND DEVICE

TECHNICAL FIELD

The present invention relates to an image converting method and device that are able to properly reproduce the appearance of the original image even in an environment having different brightness.

BACKGROUND ART

Brightness varies depending on the environment in which the user uses a display device. In an environment in which external light is bright, external light irradiating on the display screen of the display device degrades the visibility of the original image.

Patent Literature 1 discloses an image processor including a gain derivation unit that derives a compression gain to be applied to the low-frequency component of an input image and an enlargement gain to be applied to the high-frequency component of the input image from illuminance acquired from an illuminance detector and a display image generator that generates a display image where the pixel value of the input image has been corrected, on the basis of the compression gain and enlargement gain derived by the gain derivation unit.

CITATION LIST

Patent Literature

[Patent Literature 1] Japanese Unexamined Patent Application Publication No. 2011-117997

SUMMARY OF THE INVENTION

Technical Problem

While the method of Patent Literature 1 improves the visibility of a display image, it may make the texture of the display image different from that of the original image.

The present invention has been made in view of the foregoing, and an object thereof is to provide an image converting method and device that are able to properly reproduce the texture of the original image even if the external light environment or the luminance of the display device itself is changed.

Solution to Problem

The present invention provides an image converting method including a JND corresponding value width acquisition step of, on the basis of input image data, acquiring a JND corresponding value width corresponding to a reflectance component of the input image data, a luminance width acquisition step of acquiring a luminance width corresponding to the JND corresponding value width or a value obtained by converting the JND corresponding value width in accordance with a predetermined rule using, as a reference, a second reference luminance different from a first reference luminance, wherein the first reference luminance is used as a reference when acquiring the JND corresponding value width, a corrected reflectance component acquisition step of acquiring a gradation width corresponding to the luminance width as a corrected reflectance component, and a mixing step of generating output image data by mixing an illumination light component of the input image data or a corrected illumination light component thereof and the corrected reflectance component.

The present inventors have investigated the cause that the texture of a display image is made different from that of the original image and noted that for human eyes, the reflectance component, whose frequency varies to a greater extent, has a greater influence on the texture than the illumination light component, whose frequency varies to a lesser extent. The present inventors have then found that even if the external light environment or the luminance of the display device itself is changed, the texture of the original image can be reproduced properly by maintaining a JND corresponding value width corresponding to the reflectance component of input image data between before and after correcting the reflectance component or by using a value obtained by converting the JND corresponding value width in accordance with a predetermined rule, and completed the present invention.

As used herein, the term "JND corresponding value width" refers to the difference between two JND corresponding values. The term "JND corresponding value width corresponding to the reflectance component of the input image data" refers to the difference between a JND corresponding value corresponding to a luminance corresponding to all light components of the input image data and a JND corresponding value corresponding to a luminance corresponding to the illumination light component of the input image data.

A JND corresponding value is a value corresponding to a luminance one-to-one and is, for example, a JND index according to the DICOM standard based on the Barten Model for visual recognition. If the minimum luminance difference of a given target perceivable by an average human observer is defined as 1 JND (just-noticeable difference), a JND index is a value such that one step in the index results in a luminance difference that is a just-noticeable difference. Instead of a JND index, data corresponding to the minimum luminance difference derived using a method other than the Barten Model and perceivable by an observer may be used as a JND corresponding value.

Various embodiments of the present invention are described below. The embodiments below can be combined with each other.

Preferably, the predetermined rule uses a predetermined correction function, wherein the predetermined correction function including at least one of a multiplication coefficient or a division coefficient, an addition constant or a subtraction constant, and a table or a formula in which the JND corresponding value width and the value obtained by converting the JND corresponding value width are associated with each other.

Preferably, the JND corresponding value width acquisition step includes acquiring, as the JND corresponding value width, the difference between a JND corresponding value corresponding to the illumination light component of the input image data and a JND corresponding value corresponding to all light components of the input image data.

Preferably, the image converting method further includes a gradation/luminance conversion step of converting gradation values of the illumination light component and the all light components of the input image data into luminances, and the JND corresponding value width acquisition step includes acquiring the JND corresponding value width corresponding to the difference between the luminances.

Preferably, the first reference luminance is a luminance corresponding to the illumination light component or the all light components of the input image data.

Preferably, the second reference luminance is a luminance obtained by correcting the first reference luminance on the basis of intensity of external light, or a luminance set by a user.

Preferably, all the steps are performed on a pixel by pixel basis.

Preferably, there is provided an image converting device including a JND corresponding value width acquisition unit configured to, on the basis of input image data, acquire a JND corresponding value width corresponding to a reflectance component of the input image data, a luminance width acquisition unit configured to acquire a luminance width corresponding to the JND corresponding value width or a value obtained by converting the JND corresponding value width in accordance with a predetermined rule using, as a reference, a second reference luminance different from a first reference luminance, wherein the first reference luminance is used as a reference when acquiring the JND corresponding value width, a corrected reflectance component acquisition unit configured to acquire a gradation width corresponding to the luminance width as a corrected reflectance component, and a mixer configured to generate output image data by mixing an illumination light component of the input image data or a corrected illumination light component thereof and the corrected reflectance component.

DESCRIPTION OF EMBODIMENTS

Now, embodiments of the present invention will be described with reference to the drawings. Various features described in the embodiments below can be combined with each other.

1. First Embodiment

Figure 1:
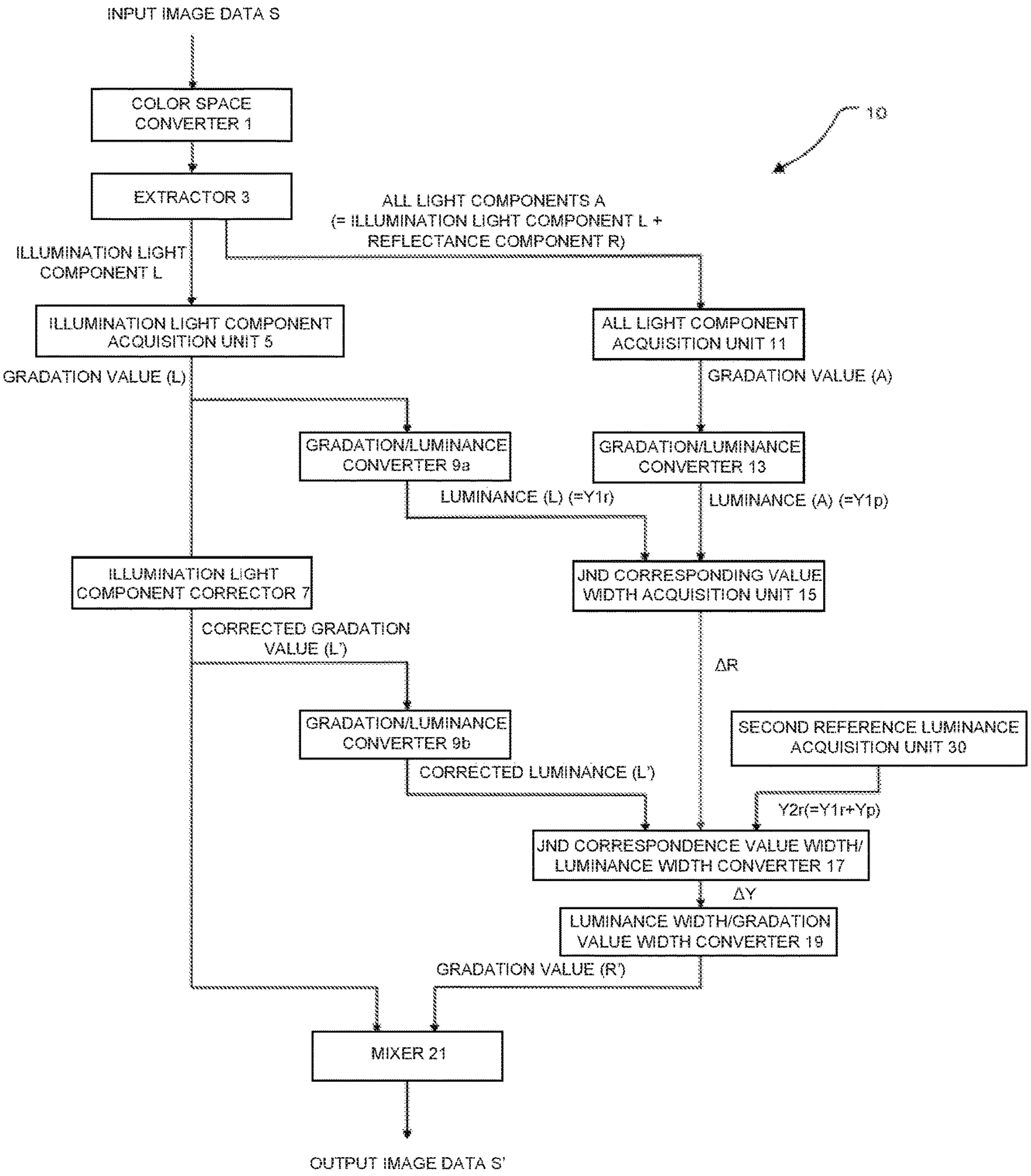
FIG. 1 is a block diagram of an image converting device of a first embodiment of the present invention.

FIG. 1 is a block diagram showing the configuration of an image converting device 10 according to a first embodiment of the present invention. The image converting device 10 includes a color space converter 1, an extractor 3, an illumination light component acquisition unit 5, an illumination light component corrector 7, gradation/luminance converters 9*a*, 9*b*, an all light component acquisition unit 11, a gradation/luminance converter 13, a JND corresponding value width acquisition unit 15, a JND corresponding value width/luminance width converter 17, a luminance width/gradation value width converter 19, and a mixer 21.

The color space converter 1 converts the color space of input image data S. For example, the color space converter 1 converts the RGB color space of the input image data S into an HSV color space. Such conversion is performed using a typical conversion formula. The extractor 3 is a filter that extracts an illumination light component L from the input image data S. For example, an edge-preserving low-pass filter can be used. If the extractor 3 is an edge-preserving low-pass filter, it extracts an illumination light component L from the input image data S by calculating the weighted average of local brightness with respect to the input image data S and outputs the illumination light component L to the illumination light component acquisition unit 5. The illumination light component acquisition unit 5 acquires the illumination light component L from the extractor 3. The illumination light component corrector 7 corrects the gradation of the illumination light component L and outputs the corrected illumination light component L'. The illumination light component corrector 7 may use any correction technique and may use LGain, which is a parameter for determining the mixing ratio to generate a mixed image of a correction component and the original illumination light component L. Note that the illumination light component corrector 7 may correct the illumination light component L as necessary. The gradation/luminance converter 9*a* converts the gradation value of the illumination light component L into a luminance, and the gradation/luminance converter 9*b* converts the gradation value of the corrected illumination light component L' into a luminance. Such conversion can be changed in accordance with the properties of a display device. Examples of available conversion techniques include a formula defining the relationship between the gradation value and the luminance and a previously generated lookup table. These techniques allow for conversion of the gradation value into a luminance, as well as for inverse conversion of the luminance into a gradation value. The gradation/luminance converter 9*a* obtains, as a first reference luminance $Y_{1r}$, the luminance converted from the illumination light component L and outputs the first reference luminance $Y_{1r}$ to the JND corresponding value width acquisition unit 15.

The all light component acquisition unit 11 acquires all light components A, which are the sum of the illumination light component L and the reflectance component R of the input image data S and outputs the all light components A to the gradation/luminance converter 13. The gradation/luminance converter 13 acquires the all light components A and converts the gradation value of the all light components A into a luminance. The conversion technique is similar to that used by the gradation/luminance converter 9. The gradation/luminance converter 13 then outputs this luminance to the JND corresponding value width acquisition unit 15 as a first luminance $Y_{1p}$.

The JND corresponding value width acquisition unit 15 acquires a JND corresponding value width ΔR corresponding to the reflectance component R on the basis of the input image data S. Specifically, the JND corresponding value width acquisition unit 15 acquires a JND corresponding value width ΔR using the first luminance $Y_{1p}$ acquired from the gradation/luminance converter 13 and the first reference luminance $Y_{1r}$ acquired from the gradation/luminance converter 9. This will be described with reference to FIG. 2.

Figure 2:
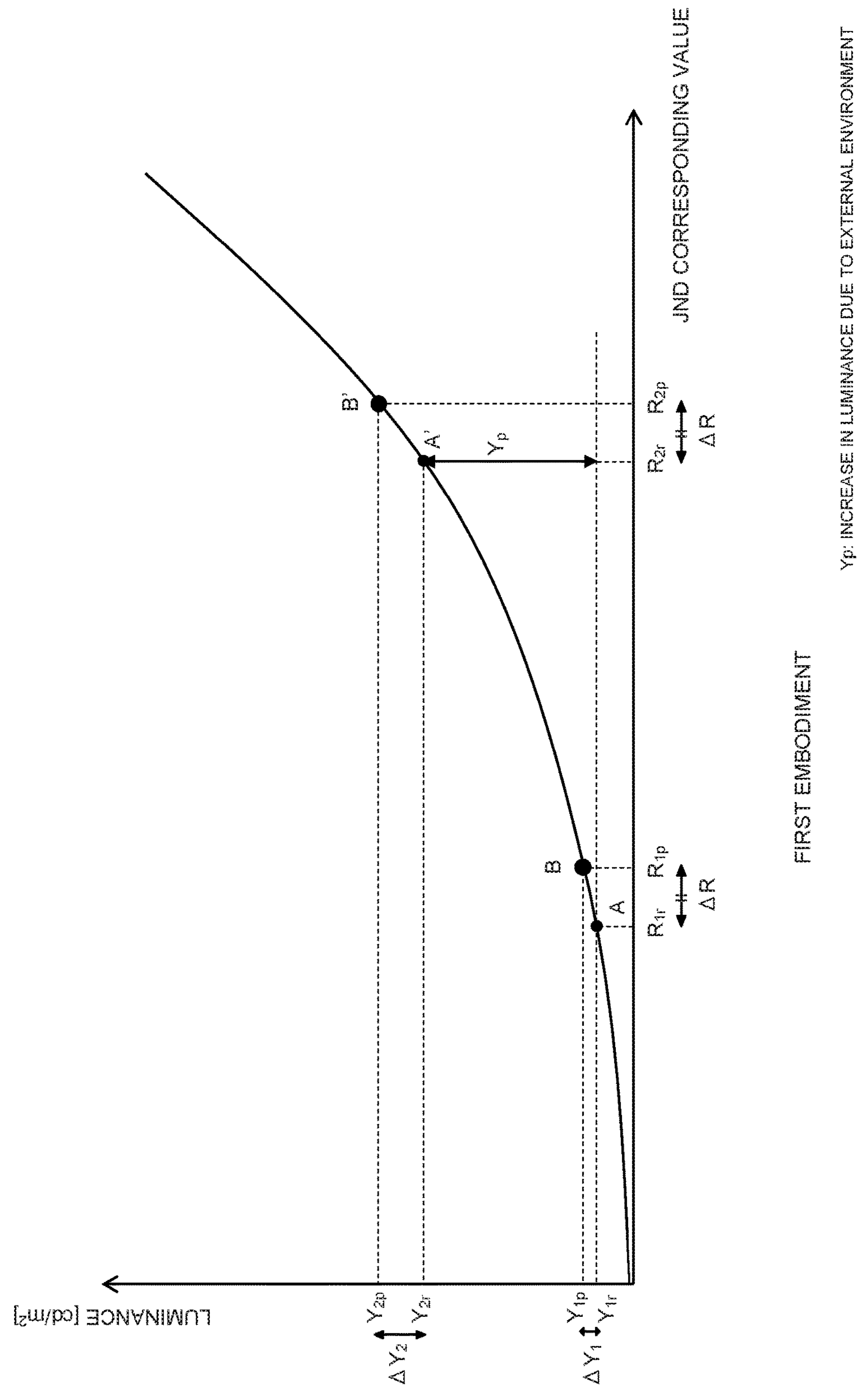
FIG. 2 is a diagram showing the correction of a reflectance component according to the first embodiment of the present invention.

FIG. 2 is a graph showing the correspondence between the JND corresponding value and the luminance. The minimum luminance difference of a given target perceivable by an average human observer is defined as 1 JND corresponding value. As shown in FIG. 2, while the average human observer can sensitively perceive changes in luminance when the luminance is low, he or she becomes insensitive to changes in luminance when the luminance is high. For the simplicity of description, it is assumed that the illumination light component corrector 7 has not corrected the illumination light component. First, a point corresponding to the first reference luminance $Y_{1r}$ acquired by the gradation/luminance converter 9*a* is plotted as a point A on a graph. The point A corresponds to the illumination light component L of the input image data S. Then, a point corresponding to the first luminance $Y_{1p}$ acquired by the gradation/luminance converter 13 is plotted as a point B on the graph. The point B corresponds to the all light components A of the input image data S. The JND corresponding value width acquisition unit 15 then acquires the difference between a JND corresponding value $R_{1r}$ corresponding to the point A and a JND corresponding value $R_{1p}$ corresponding to the point B. This difference is the JND corresponding value width ΔR corresponding to the reflectance component R. The JND corresponding value width ΔR can be said to be a JND corresponding value width corresponding to a luminance width $\Delta Y_1$, which is the difference between the first reference luminance $Y_{1r}$ and the first luminance $Y_{1p}$. If the JND corresponding value is a JND index defined by the DICOM standard, the JND corresponding value width acquisition unit 15 can acquire a JND corresponding value from the luminance on the basis of the following conversion formula.

Luminance→JND INDEX $$J(L)=A+B\cdot\mathrm{Log}_{10}(L)+C\cdot(\mathrm{Log}_{10}(L))^2+D\cdot(\mathrm{Log}_{10}(L))^3+E\cdot(\mathrm{Log}_{10}(L))^4+F\cdot(\mathrm{Log}_{10}(L))^5+G\cdot(\mathrm{Log}_{10}(L))^6+H\cdot(\mathrm{Log}_{10}(L))^7+I\cdot(\mathrm{Log}_{10}(L))^8$$ [Formula 1]

A=71.498068, B=94593053, C=41.912053, D=9.8247004 E=0.28175407, F=−1.1878455, G=−0.18014349, H=0.14710899 I=−0.017046845

Referring back to FIG. 1, the description of the image converting device 10 will be continued. The JND corresponding value width/luminance width converter 17 acquires a second reference luminance $Y_{2r}$ different from the first reference luminance $Y_{1r}$ from a second reference luminance acquisition unit 30. The JND corresponding value width/luminance width converter 17 acquires, using the second reference luminance $Y_{2r}$ as a reference, a luminance width $\Delta Y_2$ corresponding to the JND corresponding value width ΔR or a luminance width $\Delta Y_2$ corresponding to a value obtained by converting the JND corresponding value width ΔR in accordance with a predetermined rule. In the first embodiment, the second reference luminance $Y_{2r}$ is a luminance obtained by adding a luminance $Y_p$ based on external light to the first reference luminance $Y_{1r}$. If external light is the same and the same input image data S is displayed on a display device having a user-controlled luminance (a higher luminance than the first reference luminance $Y_{1r}$), the user-controlled luminance may be used as the second reference luminance $Y_{2r}$. TO measure the surface luminance of the display device, the second reference luminance acquisition unit 30 may use, for example, an illuminance sensor.

This will be described with reference to FIG. 2. First, a point corresponding to the second reference luminance $Y_{2r}$ is plotted as a point A' on the graph. The point A' corresponds to the illumination light component L whose luminance has been increased by external light or user setting. Then, a JND corresponding value $R_{2p}$ corresponding to a value maintaining the JND corresponding value width ΔR is calculated from a JND corresponding value $R_{2r}$ corresponding to the point A', and a point corresponding to the JND corresponding value $R_{2p}$ is plotted as a point B' on the graph. The point B' corresponds to the all light components A whose reflectance component R has been corrected. Then, the difference between a second reference luminance $Y_{2r}$ corresponding to the point A' and a luminance $Y_{2p}$ corresponding to the point B' is acquired. This difference is a luminance width $\Delta Y_2$ corresponding to the corrected reflectance component R. If the JND corresponding value is a JND index defined by the DICOM standard, the JND corresponding value width/luminance width converter 17 can obtain a luminance from the JND corresponding value on the basis of the following conversion formula.

[Formula 2]

· *JND* INDEX → luminance $$\log_{10}L(j)=\frac{a+c\cdot\mathrm{Ln}(j)+e\cdot(\mathrm{Ln}(j))^2+g\cdot(\mathrm{Ln}(j))^3+m\cdot(\mathrm{Ln}(j))^4}{1+b\cdot\mathrm{Ln}(j)+d\cdot(\mathrm{Ln}(j))^2+f\cdot(\mathrm{Ln}(j))^3+h\cdot(\mathrm{Ln}(j))^4+k\cdot(\mathrm{Ln}(j))^5}$$

$j=1\sim1023$ $a=-1.3011877,$ $b=-2.5840191E-2,$ $c=8.0242636E-2,$ $d=1.0320229E-1$ $e=1.3646699E-1,$ $f=2.8745620E-2,$ $g=-2.5468404E-2,$ $h=-3.1978977E-3$ $k=1.2992634E-4,$ $m=1.3635334E-3$ The luminance width/gradation value width converter 19 acquires the luminance width $\Delta Y_2$ from the JND corresponding value width/luminance width converter 17 and converts the luminance width $\Delta Y_2$ into a gradation width serving as a corrected reflectance component R'.

Figure 3:
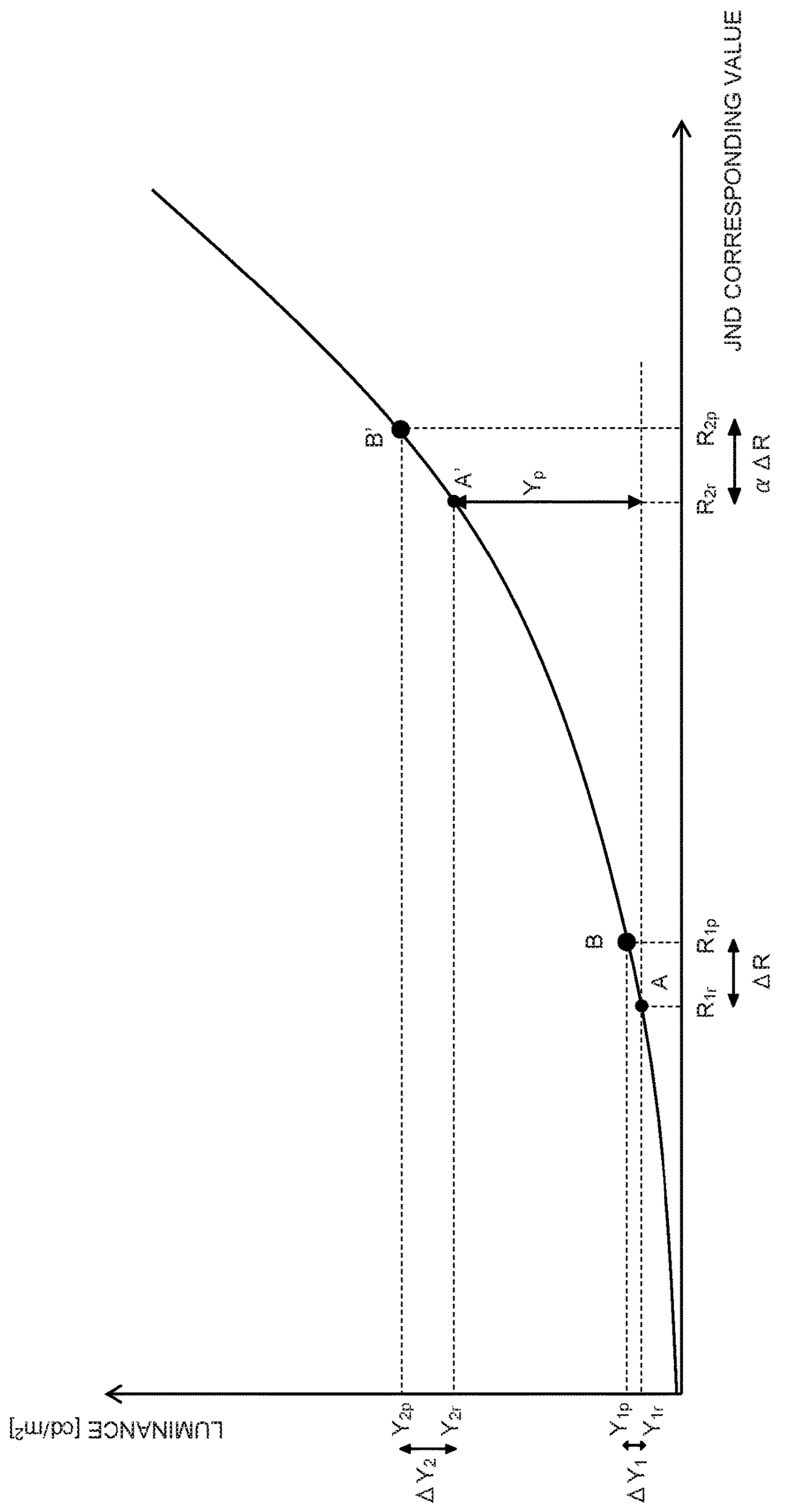
FIG. 3 is a diagram showing another example of a reflectance component according to the first embodiment of the present invention.

Instead of calculating the JND corresponding value $R_{2p}$ corresponding to the value maintaining the JND corresponding value width ΔR from the JND corresponding value $R_{2r}$, the reflectance component R may be corrected using another method shown in FIG. 3. The method shown in FIG. 3 involves converting the JND corresponding value width ΔR in accordance with a predetermined rule using the second reference luminance $Y_{2r}$ as a reference and acquiring a luminance width corresponding to the converted value. Specifically, the JND corresponding value $R_{2p}$ corresponding to a value obtained by multiplying the JND corresponding value width ΔR by a correction coefficient α (α is a greater positive integer than 0) is calculated from the JND corresponding value $R_{2r}$ corresponding to the second reference luminance $Y_{2r}$. The subsequent process is similar to that shown in FIG. 2 and therefore is omitted. Instead of the multiplication by the correction coefficient α, any of the following rules may be used as the predetermined rule:

1. "JND corresponding value width ΔR×α=corrected JND corresponding value width" (JND corresponding value of point A>200, correction coefficient=α)

"JND corresponding value width ΔR×β=corrected JND corresponding value width" (JND corresponding value of point A<200, correction coefficient=β)

2. "JND corresponding value width ΔR×(α−(JND corresponding value of point A−γ))=corrected JND corresponding value width" (correction coefficient=(α−(JND corresponding value of point A−γ))
3. "JND corresponding value width ΔR+0.1=corrected JND corresponding value width" (correction constant=0.1)
4. "JND corresponding value width ΔR+0.1 (JND corresponding value of point A−γ))=corrected JND corresponding value width" (correction coefficient=0.1 (JND corresponding value of point A−γ))

As seen above, any correction function (including correction coefficients and correction constants) can be used as the predetermined rule. In other words, the value obtained by converting the JND corresponding value width in accordance with the predetermined rule may be a value obtained by multiplying the JND corresponding value width by a predetermined value or adding a predetermined value thereto, or may be a value obtained by dividing the JND corresponding value width by a predetermined value or subtracting a predetermined value therefrom. The value may also be an output value obtained by inputting the JND corresponding value width to a predetermined correction function. Further, a table in which JND corresponding value widths are associated with predetermined values may be used.

The correction coefficient α is preferably 0.01 to 10, more preferably 0.1 to 5, even more preferably 0.5 to 1.5. The correction coefficient α may also be any value between two of the values presented. When the correction coefficient α is 1, that is, when a JND corresponding value $R_{2p}$ corresponding to a value maintaining the JND corresponding value width ΔR is calculated from the JND corresponding value $R_{2r}$, the JND corresponding value width ΔR of the reflectance component R in the original environment is maintained even in an environment whose brightness differs from that of the original environment. Accordingly, the "appearance" seen by human eyes is reproduced properly. When the correction coefficient α is greater than 0 and smaller than 1, the second luminance $Y_{2p}$ becomes a smaller value and therefore an image where the brightness of the corrected reflectance component R' is suppressed can be obtained. On the other hand, when the correction coefficient α is greater than 1, the second luminance $Y_{2p}$ becomes a greater value and therefore the contrast of the corrected reflectance component R' is emphasized.

Figure 5:
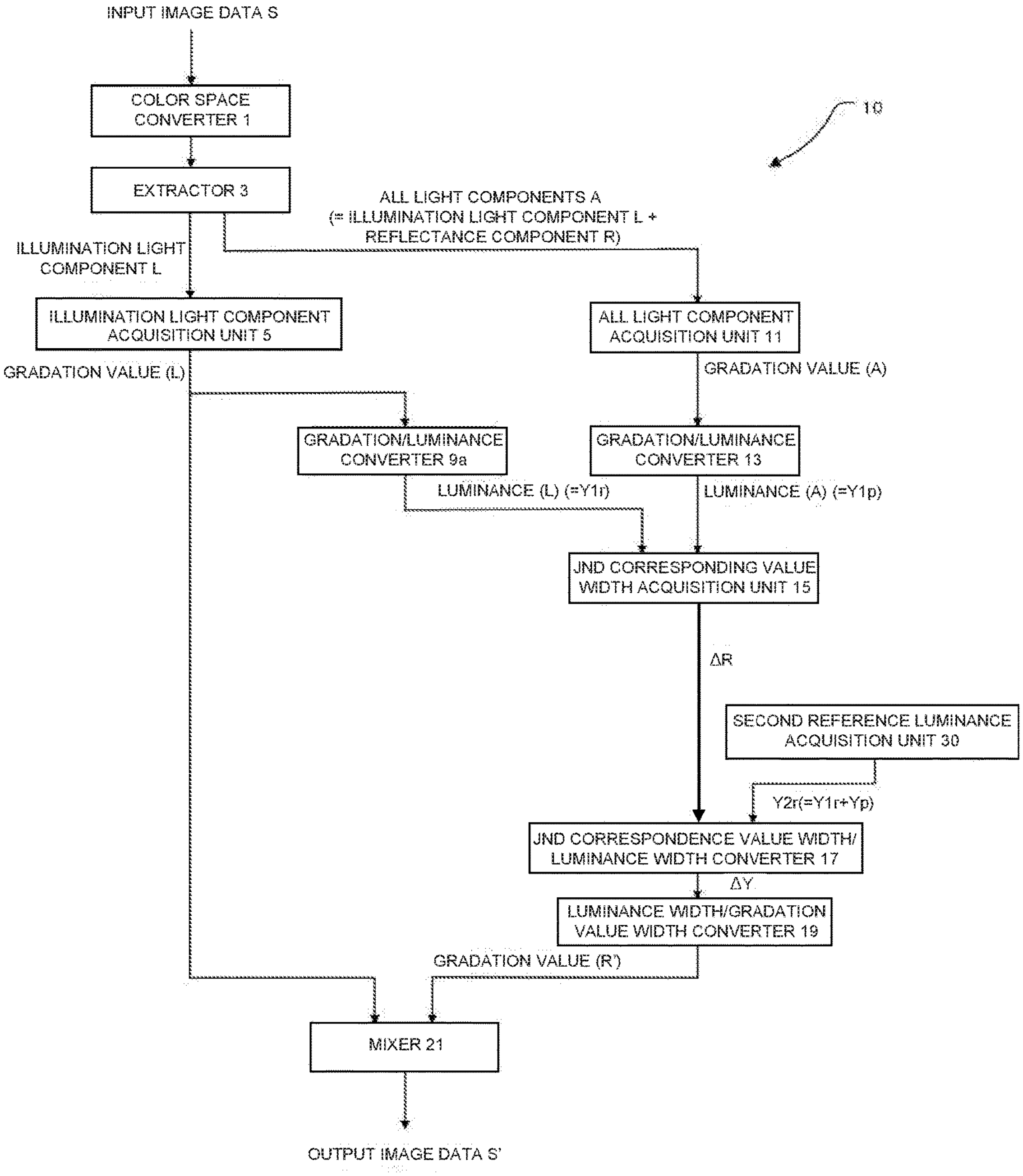
FIG. 5 is another block diagram of the image converting device of the first embodiment of the present invention.

Then, as shown in FIG. 1, the mixer 21 acquires the illumination light component L' from the illumination light component corrector 7 and acquires the corrected reflectance component R' from the luminance width/gradation value width converter 19. The mixer 21 then mixes the illumination light component L' and the reflectance component R', and outputs output image data S'. The above steps are performed on a pixel by pixel basis. Note that as shown in FIG. 5, instead of acquiring the illumination light component L' from the illumination light component corrector 7, the mixer 21 may acquire the illumination light component L from the illumination light component acquisition unit 5.

Subsequently, the range of the output image data S' may be corrected using a range corrector (not shown). Also, the HSV color space of the range-corrected output image data S' may be converted into an RGB color space using a color space inverse converter (not shown).

As shown in FIG. 1, when the illumination light component corrector 7 corrects the illumination light component, the gradation/luminance converter 9*b* converts the gradation value of the corrected illumination light component L' into a luminance and outputs this luminance to the JND corresponding value width/luminance width converter 17. The JND corresponding value width/luminance width converter 17 sums up the luminance received from the gradation/luminance converter 9*b* and the second reference luminance $Y_{2r}$ acquired from the second reference luminance acquisition unit 30 to obtain a second reference luminance $Y_{2r}'$. In the process of obtaining a luminance from the JND corresponding value, the JND corresponding value width/luminance width converter 17 only has to read the above second reference luminance $Y_{2r}$ as the second reference luminance $Y_{2r}'$. Then, the mixer 21 acquires the illumination light component L' from the illumination light component corrector 7, acquires the corrected reflectance component R' from the luminance width/gradation value width converter 19, and mixes these components.

As described above, in the first embodiment, the JND corresponding value width (of the reflectance component R) based on a human function evaluation is maintained between before and after correction, or is converted in accordance with the predetermined rule. Thus, relative characteristics of the image are maintained between before and after correction. Thus, even if the external light environment or the luminance of the display device itself is changed, the appearance of the original image can be reproduced properly. By using the knowledge that human eyes more strongly react to relative characteristics of an image than to absolute characteristics thereof, the "appearance" of "texture" of details of the original image can be reproduced properly.

2. Second Embodiment

Figure 4:
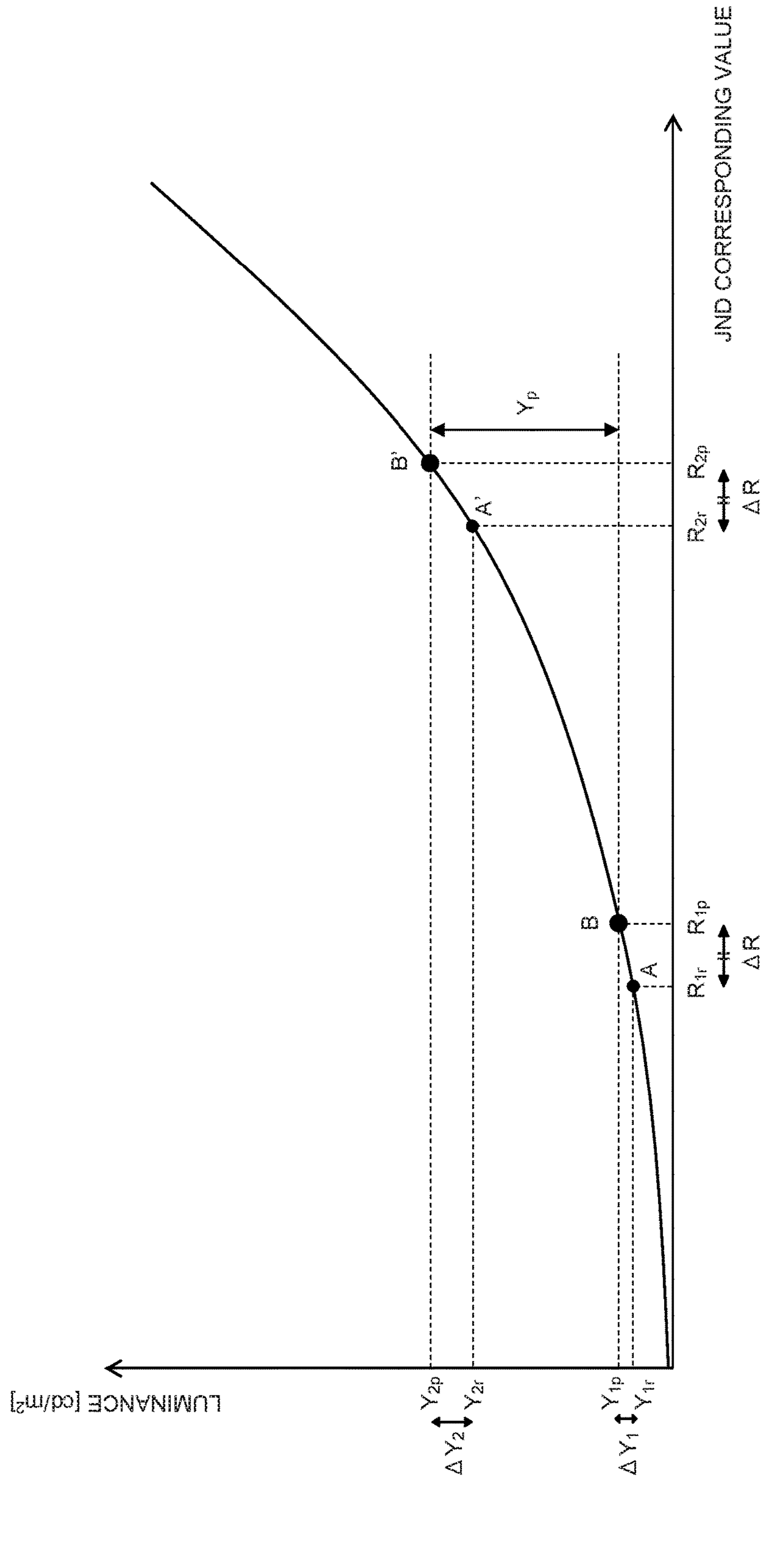
FIG. 4 is a diagram showing the correction of a reflectance component according to a second embodiment of the present invention.

Next, an image converting method using an image converting device 10 according to a second embodiment of the present invention will be described. FIG. 4 is a diagram showing the correction of a reflectance component according to the second embodiment of the present invention. The second embodiment differs from the first embodiment in that while the luminance corresponding to the illumination light component L or the corrected illumination light component L' of the input image data S is used as the first reference luminance $Y_{1r}$ in the first embodiment, a luminance corresponding to all light components A is used as a first reference luminance in the second embodiment. The configuration of the image converting device 10 is similar to that in the first embodiment and therefore will not be described.

In the second embodiment, the luminance corresponding to the all light components A is used as the first reference luminance and therefore a point B' corresponding to a second reference luminance corresponds to the all light components A whose luminance has been increased by external light or user setting. A JND corresponding value $R_{2r}$ corresponding to a value maintaining a JND corresponding value width ΔR is calculated from a JND corresponding value $R_{2p}$ corresponding to the point B', and a point corresponding to the JND corresponding value $R_{2r}$ is plotted as a point A' on the graph. The point A' corresponds to an illumination light component L after the reflectance component R has been corrected. Then, the difference between a second reference luminance $Y_{2r}$ corresponding to the point A' and a luminance $Y_{2p}$ corresponding to the point B' is acquired. This difference is a luminance width $\Delta Y_2$ corresponding to a corrected reflectance component R.

Later steps are similar to those in the first embodiment. In the second embodiment also, there may be acquired a luminance width corresponding to a value obtained by converting the JND corresponding value width ΔR in accordance with a predetermined rule.

In the second embodiment also, relative characteristics of the image are maintained between before and after correction by maintaining the JND corresponding value width of the reflectance component R between before and after correction or using a value obtained by converting the JND corresponding value width in accordance with a predetermined rule. Thus, even if the external light environment or the luminance of the display device itself is changed, the appearance of the original image can be reproduced properly.

While the various embodiments have been described, the present invention is not limited thereto.

Among methods for calculating the JND corresponding value width ΔR corresponding to the reflectance component R, there are methods using linear approximation. One example of such a method is as follows: in FIGS. 2 to 4, 1 is added to the JND corresponding value $R_{1r}$ corresponding to the point A corresponding to the illumination light component L; 1 is subtracted from the JND corresponding value $R_{1r}$ corresponding to the point A, and the "inclination" between the points on the graph corresponding to the resulting JND corresponding values is calculated; then, an unit luminance corresponding to 1 JND is obtained, and there is created an LUT in which luminances and JND corresponding values are associated with each other; and using this LUT, the differential luminance between the illumination light component and the reflectance component is expressed in the unit luminance corresponding to 1 JND.

Use of the above method allows the JND corresponding value width ΔR to be calculated quickly with reference to the LUT created in advance, without having to perform complicated calculations as shown in Formulas 1 and 2.

The image converting device 10 may be incorporated in a display device, or may be provided as an external conversion box (set-top box) of a display device. Also, the image converting device 10 may be provided as an application specific integrated circuit (ASIC), field-programmable gate array (FPGA), or dynamic reconfigurable processor (DRP) that implements the functions of the image converting device 10.

DESCRIPTION OF REFERENCE SIGNS

1: color space converter, 3: extractor, 5: illumination light component acquisition unit, 7: illumination light component corrector, 9: gradation/luminance converter, 11: all light component acquisition unit, 13: gradation/luminance converter, 15: JND corresponding value width acquisition unit, 17: JND correspondence value width/luminance width converter, 19: luminance width/gradation value width converter, 21: mixer, 10: image converting device, 30: second reference luminance acquisition unit

The invention claimed is:

1. An image converting method comprising:

a JND corresponding value width acquisition step of, on the basis of input image data, acquiring a JND corresponding value width corresponding to a reflectance component of the input image data;

a luminance width acquisition step of acquiring a luminance width corresponding to the JND corresponding value width or a value obtained by converting the JND corresponding value width in accordance with a predetermined rule using, as a reference, a second reference luminance different from a first reference luminance, wherein the first reference luminance is used as a reference when acquiring the JND corresponding value width;

a corrected reflectance component acquisition step of acquiring a gradation width corresponding to the luminance width as a corrected reflectance component; and a mixing step of generating output image data by mixing an illumination light component of the input image data or a corrected illumination light component thereof and the corrected reflectance component.

2. The image converting method of claim 1, wherein the predetermined rule uses a predetermined correction function, wherein the predetermined correction function comprises at least one of a multiplication coefficient or a division coefficient, an addition constant or a subtraction constant, and a table or a formula in which the JND corresponding value width and the value obtained by converting the JND corresponding value width are associated with each other.

3. The image converting method of claim 1, wherein the JND corresponding value width acquisition step comprises acquiring, as the JND corresponding value width, the difference between a JND corresponding value corresponding to the illumination light component of the input image data and a JND corresponding value corresponding to all light components of the input image data.

4. The image converting method of claim 3, further comprising a gradation/luminance conversion step of converting gradation values of the illumination light component and the all light components of the input image data into luminances, wherein the JND corresponding value width acquisition step comprises acquiring the JND corresponding value width corresponding to the difference between the luminances.

5. The image converting method of claim 1, wherein the first reference luminance is a luminance corresponding to the illumination light component or the all light components of the input image data.

6. The image converting method of claim 1, wherein the second reference luminance is a luminance obtained by correcting the first reference luminance on the basis of intensity of external light, or a luminance set by a user.

7. The image converting method of claim 1, wherein all the steps are performed on a pixel by pixel basis.

8. An image converting device comprising:

a JND corresponding value width acquisition unit configured to, on the basis of input image data, acquire a JND corresponding value width corresponding to a reflectance component of the input image data;

a luminance width acquisition unit configured to acquire a luminance width corresponding to the JND corresponding value width or a value obtained by converting the JND corresponding value width in accordance with a predetermined rule using, as a reference, a second reference luminance different from a first reference luminance, wherein the first reference luminance is used as a reference when acquiring the JND corresponding value width;

a corrected reflectance component acquisition unit configured to acquire a gradation width corresponding to the luminance width as a corrected reflectance component; and a mixer configured to generate output image data by mixing an illumination light component of the input image data or a corrected illumination light component thereof and the corrected reflectance component.

* * * * *